Patented June 24, 1924.

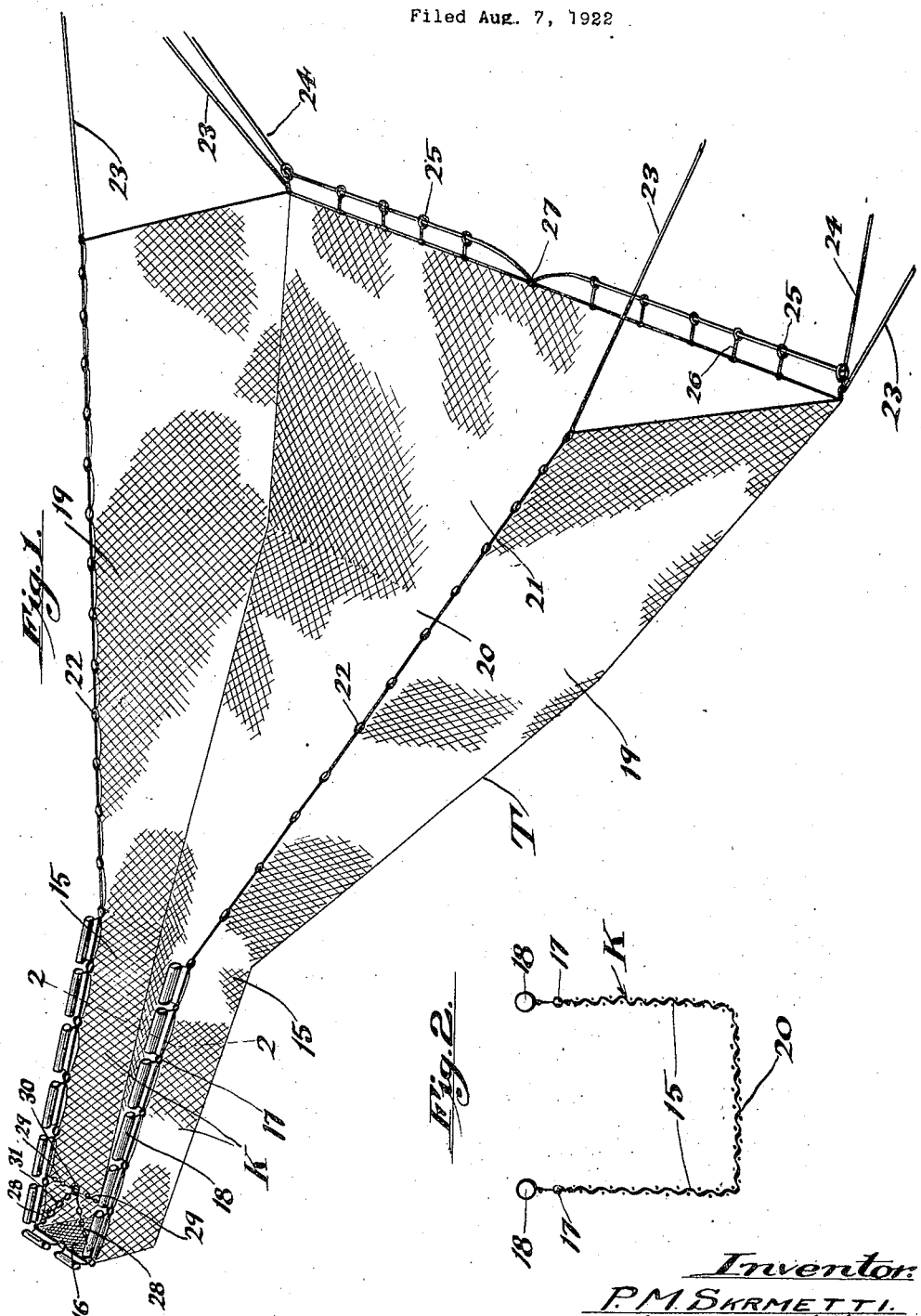

1,498,760

UNITED STATES PATENT OFFICE.

PAUL M. SKRMETTI, OF SAN PEDRO, CALIFORNIA, ASSIGNOR TO FLOATING TRAWL CORPORATION, OF SAN PEDRO, CALIFORNIA, A CORPORATION OF CALIFORNIA.

FLOATING TRAWL.

Application filed August 7, 1922. Serial No. 580,216.

*To all whom it may concern:*

Be it known that I, PAUL M. SKRMETTI, a citizen of Austria, residing at San Pedro, in the county of Los Angeles and State of California, have invented new and useful Improvements in Floating Trawls, of which the following is a specification.

My invention relates to fishing seines, and more particularly to floating trawls, a purpose of my invention being the provision of a floating trawl including a collecting section arranged for suspension at the surface of the water, and a trough section in advance of the collecting section and having its entrance end positioned on or adjacent the bed of a body of water so that when the trawl is moved, the trough section will serve to direct fish and other maritime life upwardly into the collecting section.

It is also a purpose of my invention to provide a floating trawl in which means is embodied for facilitating the movement and floating of the trough section upon the collecting section, and means for elevating the collecting section in such manner as to deposit the trapped fish within one end of the collecting section.

Although I have herein shown and described only one form of floating trawl embodying my invention, it is to be understood that various changes and modifications may be made herein without departing from the spirit of the invention and the spirit and scope of the appended claims.

In the accompanying drawings,

Figure 1 is a view showing in perspective one form of floating trawl embodying my invention.

Fig. 2 is a transverse sectional view taken on the line 2—2 of Fig. 1.

Referring specifically to the drawings in which similar reference characters refer to similar parts, my invention, in its present embodiment, comprises a collecting section designated at K and a trough section designated at T, the latter constituting a continuation of the former and provided at its larger or entrance end with cables or ropes adapted for attachment to boats for moving the trawl as a unit through the water.

The collecting section K, in the present instance, is shown of U formation in cross section as clearly shown in Fig. 2, and this section is shown as comprising side walls 15 formed of suitable netting and an end wall 16 also formed of netting and arranged to close one end of the collecting section. Along the upper edge of the collecting section cork floats 17 are arranged at regular intervals, and above these floats are relatively smaller air tight tanks 18 which are designed for the purpose of sustaining the collecting section adjacent the surface of the water.

As clearly shown, the open end of the collecting section K communicates with the trough section T, and the latter is tapered in width from its discharge end or that end connected to the collecting section, to the forward or entrance end. The trough section T comprises side walls 19 and bottom walls 20 and 21, and all of these walls are formed of netting as shown. The bottom wall 20 is inclined from its point of connection with the bottom wall of the collecting section downwardly to its point of connection with the bottom wall 21, the latter occupying a substantially horizontal position when in suspended position within the water. The upper edges of the side portions 19 are provided at intervals with cork floats 22 for the purpose of maintaining the sides of the trough sections in vertical positions, as will be understood.

The forward ends of the side portions 19 and the lower forward edge of the bottom portion 21 are provided with cables or ropes 23 and 24 which are adapted to be attached to boats for drawing the trawl as a unit through the water. As clearly shown, the cables 24 are extended through rings or eyes 25 connected to the edge of the bottom 21 by short sections of cable 26, and the meeting ends of the cables are permanently connected to the bottom at the point indicated at 27. This arrangement is particularly designed for the purpose of facilitating the folding of the trough section upon the collecting sections and to distribute the weight of the trough section equally between the two boats employed in connection with the trawl.

In operation, the collecting section is sustained adjacent the surface of the water by means of the tanks 18, while the trough section T is sustained in depending relation to the collecting section with the entrance end disposed on or adjacent the bed of the body of water in which the trawl is operated. With the cables 23 attached to the boats, the forward movement of the boats obviously effects the dragging of the trawl through the water and because of the arrangement of the entrance end of the trawl section, the fish or other maritime life are trapped within the trough and directed upwardly into the collecting section K.

When collecting fish trapped within the collecting section, the boats are moved rearwardly in the direction of the trawl, and through the medium of the cables 23—24 the trough section is lifted and folded upon the collecting section, it being particularly noted that the connection of the cables 24 with the trough section equally distributes the weight of the latter between the two boats.

For facilitating the folding of the collecting section, to effect the collection of the fish at one end of the section, short lengths of cables 28 are connected to the rear corners of the collecting section K, and other cables 29 are connected to the upper edges of the sides 15 at a point in advance of the cables 28. The free ends of all of the cables are connected to each other at the point indicated at 30, and each cable carries a plurality of cork floats 31 for normally sustaining the cables in floating position upon the surface of the water. It will thus be seen that the fish contained within the collecting section are directed to the rear end thereof and effectively trapped to facilitate the removal thereof from the trawl.

What is claimed is:

1. A floating trawl comprising a collecting section, floats associated with the collecting section adapted to sustain the section in floating position adjacent the surface of the water, the trough section communicating with the collecting section, and flexible members associated with the collecting section to effect a constriction of the sides of the section.

2. A folding trawl comprising a foldable collecting section, and a trough section communicating with and in advance of the collecting section, said trough section including a flat bottom portion, and an upwardly inclined bottom portion connecting the flat bottom portion to the open end of the collecting section.

3. A floating trawl comprising a collecting section, and a trough section communicating with and in advance of the collecting section, both of said sections having open tops.

4. A floating trawl comprising a collecting section, and a trough section communicating with and in advance of the collecting section, the collected section consisting of side walls, a bottom wall, and an end wall, and the trough section consisting of side walls and a bottom wall.

5. A floating trawl comprising a collecting section, and a trough section communicating with and in advance of the collecting section, said sections having open tops and the trough section being sustained in inclined relation to the collecting section and diminishing in width toward the collecting section.

In testimony whereof I have signed my name to this specification.

PAUL M. SKRMETTI.